March 10, 1964  R. W. TACCONE  3,123,873
MOLDING MACHINE
Filed Jan. 3, 1961  14 Sheets-Sheet 1
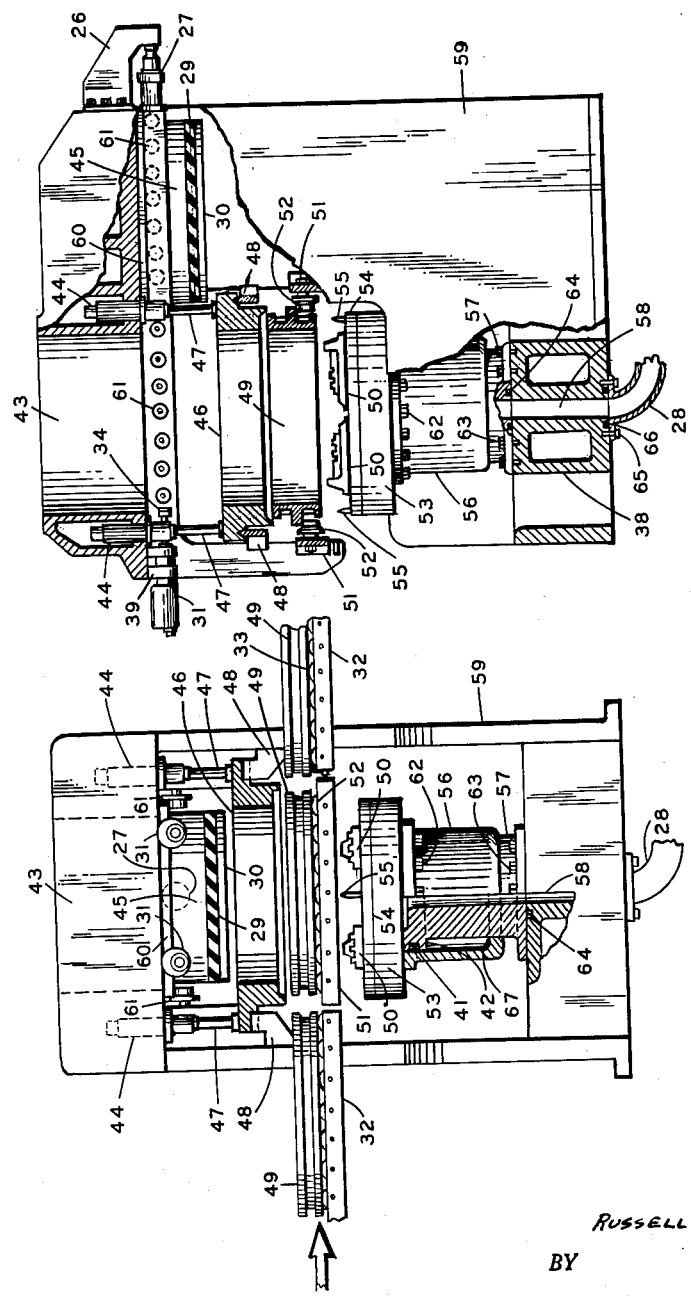
INVENTOR.
RUSSELL W. TACCONE
BY
Charles L. Lovercheck
attorney INVENTOR.
RUSSELL W. TACCONE
BY
Charles L. Lovenbeck
attorney March 10, 1964 R. W. TACCONE 3,123,873
MOLDING MACHINE
Filed Jan. 3, 1961 14 Sheets-Sheet 3

INVENTOR.
RUSSELL W. TACCONE
BY
Charles L. Lowenheck
attorney

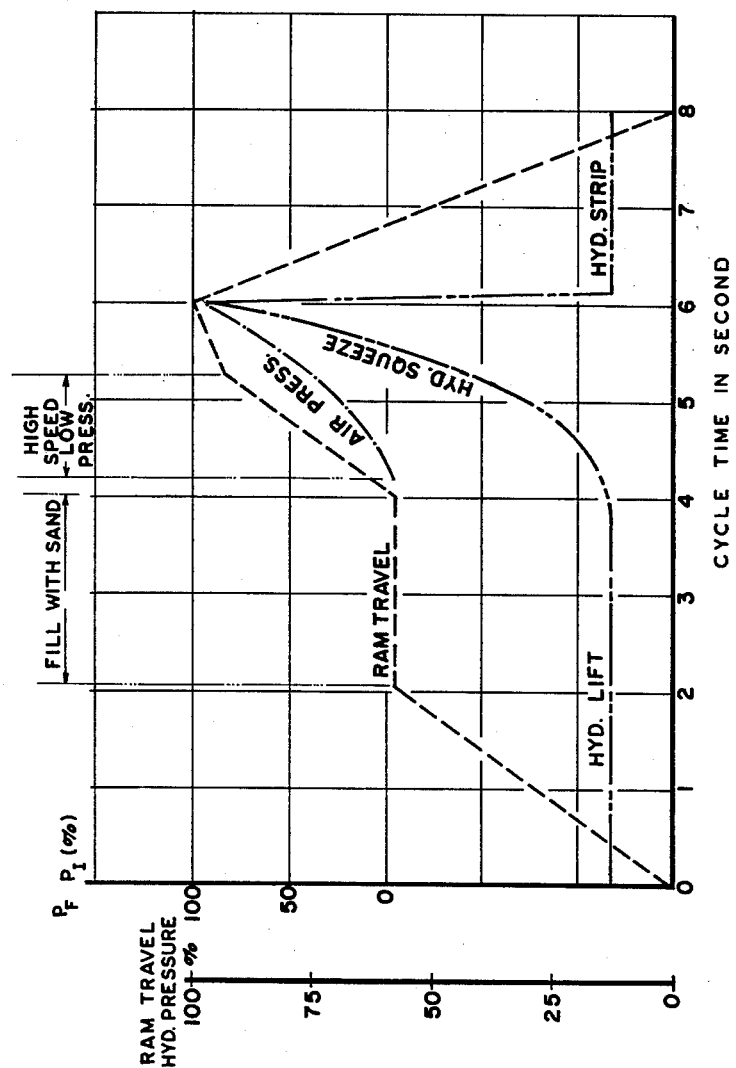

March 10, 1964 R. W. TACCONE 3,123,873
MOLDING MACHINE
Filed Jan. 3, 1961 14 Sheets-Sheet 6

INVENTOR
RUSSELL W. TACCONE
BY
Charles L. Lovenheim
attorney

March 10, 1964   R. W. TACCONE   3,123,873
MOLDING MACHINE
Filed Jan. 3, 1961   14 Sheets-Sheet 7

INVENTOR
RUSSELL W. TACCONE
BY
Charles L. Lavuchuk
attorney

March 10, 1964     R. W. TACCONE     3,123,873
MOLDING MACHINE

Filed Jan. 3, 1961     14 Sheets-Sheet 8

*INVENTOR.*
Russell W. Taccone
BY
Charles L. Lovercheck
*attorney*

March 10, 1964

R. W. TACCONE 3,123,873

MOLDING MACHINE

Filed Jan. 3, 1961

INVENTOR.
RUSSELL W. TACCONE
BY
Charles L. Lovenhel
attorney

INVENTOR.
RUSSELL W. TACCONE
BY
Charles L. Lovenkuk
atty.

March 10, 1964 R. W. TACCONE 3,123,873
MOLDING MACHINE
Filed Jan. 3, 1961 14 Sheets-Sheet 11

INVENTOR.
RUSSELL W. TACCONE
BY
Charles L. Lorencheck
atty

March 10, 1964  R. W. TACCONE  3,123,873
MOLDING MACHINE

Filed Jan. 3, 1961  14 Sheets-Sheet 12

204' AREA OF COMPENSATING PAD

205' AREA OF RIGID FRAME

INVENTOR.
RUSSELL W. TACCONE
BY
Charles L. Lovercheck
attorney

March 10, 1964 R. W. TACCONE 3,123,873
MOLDING MACHINE
Filed Jan. 3, 1961 14 Sheets-Sheet 13

INVENTOR
RUSSELL W. TACCONE
BY

March 10, 1964 R. W. TACCONE 3,123,873
MOLDING MACHINE
Filed Jan. 3, 1961 14 Sheets-Sheet 14

INVENTOR.
Russell W. Taccone
BY
Charles L. Lovercheck
attorney 3,123,873
MOLDING MACHINE
Russell W. Taccone, Erie, Pa., assignor to Taccone Corporation, North East, Pa., a corporation of Pennsylvania
Filed Jan. 3, 1961, Ser. No. 80,212
2 Claims. (Cl. 22—42)

This invention relates to molding machines and, more particularly, to machines for making molds for sand castings and the like.

Because of foundry techniques and casting characteristics, it is sometimes desirable to vary the sand density within a given mold. Previous machines did not have the ability to control mold density in order to vary it at different parts of the mold.

The method of controlling mold density disclosed herein consists of three basic steps, one or all of which may be used. These three steps of molding can be completed in as little as three seconds and it has been found best to complete the molding in as rapid a cycle as possible. The optimum in mold density or mold hardness is obtained when all three steps are used. The steps are:

(1) An initial controlled displacement of the sand.
(2) Controlling the pressures exerted on the various areas of the sand during the compacting of the sand.
(3) Utilizing an unusually high pressure in order to establish the condition under which the sand reacts as a fluid.

The invention may be carried out by a machine having a pattern plate and a means to support an empty flask over the pattern plate. The empty flask is filled with sand. A head made up of an outer frame which supports and confines a compensating pad is forced against the sand in the flask. The compensating pad may be inflated so as to compress the sand a predetermined amount at the center and to cause the sand to flow toward the outer edge of the mold, thus increasing the sand density around the outer edge of the mold on the inner surface of the flask.

The compensating pad which is extended by a controlled pressure may be made to take a predetermined shape, usually a paraboloid, which, on the initial movement, causes a displacement of sand outward and results in a higher sand density under the peripheral edges of the compensating head. The head continues to further compress the sand and the movement of the sand finally comes to a stop only when the internal resistance of the sand, due to its high density, offsets the combined forces used to compact the sand. At this point, the travel of the compensating head relative to the flask is stopped and the mold is complete.

Another important feature is that the initial flow of sand is toward the outside of the mold where the density is increased under the rigid frame which holds the compensating pad. This is important because it is in this outer area that the height of the sand above the pattern is the greatest and the frictional resistance of the flask wall to sand travel is maximum.

Still another important feature involved at this same stage is that the air entering the compensating head chamber is passed through a valve. Once the initial volume of air has flowed into the compensating head chamber, the valve can be left open during the remaining operation of the machine, partially closed, or closed entirely.

If the valve is left open at all times during operation, the air pressure in the chamber will always remain constant as the compensating head continues its stroke. If the valve is closed completely and a given volume of air is trapped in the chamber, the air pressure will be increased as the compensating head moves relative to the flask and the sand begins to develop more internal resistance due to increased density. This resistance will tend to push the compensating pad back up into the compensating head chamber which is the final stage of the actual squeeze. This increased pressure is due to the pressure-volume law that the volume is inversely proportional to the pressure, assuming that temperature remains constant. By partially closing the valve, it is possible to obtain some intermediate stage between the constant pressure and the maximum pressure by regulating the rate and, also, the time in which the air is allowed to leave the compensating head chamber during the squeezing operation. It is by this feature, along with several others, that the ratio of the force under the compensating pad to the total force applied to the sand can be varied.

Yet another important feature of the machine is directly related to the above mentioned feature which will allow the controlling of the mold hardness and sand density within the mold and, at the same time, will allow the relative mold hardness or sand density to be made to vary within the individual mold if so desired. The feature which is used to control the relation of the applied forces can best be demonstrated by the following equation:

Load (total) = load (compensating pad)
+ load (rigid frame)

This equation shows that the total load or force is divided into basic areas:

(1) The area under the rigid frame around the compensating pad; and
(2) The area under the compensating pad.

The fact that this condition can be set up is one of the reasons that this feature is important. This feature is applicable for any fluid, liquid, or gas. The method of controlling the flow may vary but the feature itself is still basically the same.

A study of the basic equation will immediately show that if a single part of the equation is varied, the other two parts will vary accordingly. By varying any one or more of the loads a controlled amount, it is possible to obtain control of the pressures resulting from these loads. It is then possible to control the sand density or mold hardness within given areas of the same mold.

Basically, the molding takes place in three stages:

(1) Preparing the top surface of the mold;
(2) Distributing the sand; and
(3) Fuidizing the sand.

The first stage, the preparation of the top of the mold, is accomplished by injecting air into the compensating tank above the compensating pad at a predetermined time to cause it to extend downwardly into the flask full of sand. By controlling the air pressure and countour of the extended compensating pad, the top surface of the mold can be controlled. Because of the shape of the compensating pad relative to the compensating tank, the compensating pad will take the general shape of a paraboloid. As the compensating pad extends downward, it displaces sand. The flow of the sand will extend radially outwardly from the surface of the compensating pad.

As the sand is moved by the compensating pad, it is restricted by two main surfaces which are the pattern and pattern plate on the bottom of the mold and flask around the outer periphery of the mold. The surface which is of the greatest importance is the upper part of the mold which is nearest the flask wall. Because of the short distance between the flask wall and the compensating pad in this area, the movement of the sand into this region will meet with resistance before the other portions of the mold and will, therefore, reach a degree of greater density. The location of this area is of importance for two reasons:

(1) It is near the outside of the mold; and
(2) It is under the rigid section of the compensating tank.

The initial sand movement is caused by sand being put into motion by the action of the pad.

There are several factors involved in the control of this action. The first factor is the initial pressure of the air or fluid which is injected into the chamber above the compensating pad. This initial pressure is of immediate importance because it is the prime force which motivates any action within the compensating pad itself. All other factors being equal, the expansion rate of the compensating pad is a direct function of the air pressure.

A second factor in controlling the shape or size to which the compensating pad will extend is the thickness of the compensating pad itself. By using a given uniform thickness, the thickness being constant over its entire area for this example, the extent to which it expands is a direct function of the thickness, all other factors again being equal.

In making sand molds, there is a critical point which the density of the mold cannot exceed and the pressure released and reapplied without cracking or damaging the mold. For sand to react as a fluid, there is a minimum amount of pressure required. This pressure is dependent upon many variable characteristics of the sand itself. For a typical flask size of about twenty-four inches by thirty-six inches, the inside dimensions, this pressure is approximately one hundred fifty p.s.i.

To be able to inject this amount of pressure at the initial stage of molding and not have the compensating pad expand enough to exceed the critical point of the mold density, it is necessary to have a compensating pad thick enough to withstand this expansion. For the typical flask of about twenty-four inches by thirty-six inches, a workable thickness has been found to be about one and one-half inches to two inches. This thickness is a function of the size of the flask, the construction of the compensating head itself, and many other factors so it will vary accordingly.

Another need for the relatively thick compensating pad is to prevent the pad from ballooning down into any small soft place in the mold which may cause the mold to crack.

Another factor is the use of a compensating pad of different uniform thickness or a pad which varies in thickness from one area thereof to another which will cause the contour of expanded compensating pad to differ from that of a compensating pad of a given uniform thickness.

The fact as to whether the compensating pad is of a single deep section or made up of several separate sheets, the total thickness of which would equal the single thickness, also has a decided affect on the expansion ability of the pad. The material of the compensating pad itself is of great importance as the flexibility, resiliency, hardness, etc. will all be contributing factors in governing the extent to which the compensating pad can be controlled in its initial expansion.

The compensating pad must be relatively thick because:

(1) The pad has to compensate for varying thickness under the final squeezing to help equalize the pressure, distribute it equally over the mold surface, and contribute to the uniformity of the mold hardness.

(2) Because of the high speed of the molding portion of the cycle (one to three seconds' actual squeezing operation), the pad must act as a shock absorbing member during the final compressing of the sand and prevent the compacted sand from fracturing due to shock.

(3) Because of the high speed of the molding operation, it is also necessary to have the pad act as a decompression member to support and cushion the finished mold when the molding pressure is instantly released, giving it the effect of holding the sand in place and reducing the effects of decompression shock to a minimum.

(4) Because of pattern shapes and contours varying along with the possibility of improper sand filling and sand preparation, the pad should have thickness to give it the necessary strength so as not to exceed the elastic limits of the pad material and cause a rupture in specific locations where the pad cross sectional area is reduced beyond its elastic limits.

(5) The compensating pad thickness has definite advantages in minimizing the effects of chafing due to the abrasiveness of sand itself and the surface scratches and cuts from foreign objects in the the sand such as tramp iron, slag, etc. These effects on a thin pad would cause rupturing because of such damage. For example, chafing or cuts with an average depth of one-eighth inch on a three-eighth inch thick pad would weaken the pad and definitely cause a rupture.

(6) Because of the time involved in replacing a ruptured pad plus the lost production, it is necessary to have a pad of sufficient cross sectional thickness and strength that, in the event of a machine malfunction, it can withstand the initial chamber pressure which does not exceed one hundred p.s.i. and not rupture while the pad is unsupported.

The method of attaching the compensating pad to the frame of the compensating tank is important as this will partially govern the resistance to flexing at this area and can thus also cause a variance in the final contour.

The size or volume of the chamber above the compensating pad is also important as the ratio of air or fluid at the final pressure to the air at the initial molding pressure is important. This ratio is $P_F/P_I$ during the molding cycle.

The control of the rate at which the air or fluid is caused to enter the chamber above the compensating pad is important because in a short time cycle operation, the speed of the relative movement is increased and, therefore, the time allotted is diminished for the compensating pad to reach its fully extended position.

The relative time within the cycle at which the air or fluid is admitted into the chamber above the compensating pad is impotrant because the relation of the compensating pad surface before it starts expanding to the surface of the sand will govern to a large degree the effectiveness and extent of the sand movement.

The relationship of the area under the compensating pad and the rigid frame will also partially control the various changes in density because the size of the extended compensating pad will govern how much sand is actually moved. If the volume of sand moved in relation to the total volume of sand in the flask is large, then there will be a greater change in density. If the relative volume displaced is small, then there will be a lesser change in density.

To summarize the first stage, there are several vital relationships which are to be taken into account, all or any combination of which will cause or give a different condition to the top surface of the mold. The following is a partial list:

(1) Pressure of air or fluid.
(2) Thickness of the compensating pad.
(3) Different uniform thickness or a single pad varying in thickness from one area to another.
(4) Single or multi-thickness.
(5) Characteristics of the pad.
(6) Method of attaching the pad.
(7) Volume of the chamber above the compensating pad.
(8) Rate of air or fluid injected.
(9) Time the air or fluid is injected.
(10) Relation of area of compensating pad and the rigid frame.

The disposition of the sand in the top of the mold, as shown in FIG. 10a after the initial squeeze, is such that the center has a concave hollow and a degree of density slightly greater than the previous top center surface 122. The sand immediately below the outer top surface 121 has a high degree of density and also constitutes a much higher column of sand from the top surface of the sand to the bottom of the pattern plate. The bottom of the sand can be either the pattern plate or the pattern itself. The top of the mold has now been prepared in the first few inches of travel of the compensating head and the mold is ready for the second stage.

Distribution of sand is the second stage. This is brought about by the continuing motion of the compensating head relative to the pattern and flask. The sand around the outer edge of the mold has the greatest density and is, therefore, affected the most by the rigid outer frame of the compensating tank as it moves further into the flask. The area 122 is deepened until the area 123 in FIG. 10a disappears. This is the area which has least affected by the first stage of preparing the top of the mold. The area 122 now has extended to the top of the pattern.

During this transition, area 122 has exended downwardly until it reaches the pattern. The increased density in area 122 and, hence, the resistance to the movement of the compensating pad has slowed its downward motion relative to the original outer frame of the compensating tank and the compensating pad has almost stopped moving and nearly reached the extent of its travel.

The ratio of the rigid area surrounding the compensating pad is critical insofar as it controls or influences the following factors:

(a) It controls the amount of the sand that is directly under the rigid member and under the flexible member of the compensating head.

(b) The ratio helps to govern the amount of pressure in order to obtain the same degree of mold hardness.

(c) For a given molding pressure, a greater sand movement is obtained for a greater area involved from the size of the flask into the center area under the compensating pad.

(d) By varying the area of the rigid member within the same mold, it is possible to vary the mold hardness or sand density because the sand flow is controlled.

(e) The rigid area around the perimeter of the compensating pad overcomes the effect of the flask wall friction and allows uniform mold hardness to the very edge of the flask and thus provides a more effective use of the flask area because patterns can be placed closer to the flask walls.

(f) The rigid area around the perimeter of the compensating pad allows a miximum mold hardness around the outer edge of the flask and affords a better "locking action" to hold the sand within the flask.

By controlling the location of the rigid member (other than the periphery of the mold), it is possible to control the mold hardness or density in these same areas. The top surface or contour of the mold can be controlled by changing the location of the rigid members other than around the periphery of the flask.

The sand distribution has taken place and the third or fluidizing stage is reached. As the relative motion of the compensating tank toward the pattern continues, a state is reached where the sand crystals are in direct contact with each other and the condition is established under which the sand reacts as a fluid. Because of the restraining action of the pattern and pattern plate in the bottom, the flask on the side, and the rigid portion compensating tank on the top, pressure can now flow only toward the center of the mold which is under the flexible compensating pad.

As the pressure moves inwardly, it has two paths to follows; that is, sideways toward the center of the mold where the force is balanced at the vortex or it can move upwardly. The extent of the upward motion is governed by the resistance of pressure above the compensating pad.

It is at this stage of the molding process that the degree of sand density and, therefore, the mold hardness, can truly be controlled. It is also at this point that the control of air leaving the chamber above the compensating pad as described in the first stage is brought into play as the control of the relationship of the two resistance areas is now effective in controlling the variance of the mold density.

An important feature in controlling the mold density or mold hardness is the fact that the compensating head can be one large chamber or can be divided into two or more compartments. This means that the compensating pad contour can be controlled to meet the requirements of a given flask size or pattern characteristic. The dividing rigid members can be located and so utilized for the most effective molding to a given condition.

Practically all of the features which apply to the single chamber head will also apply to the multiple chamber head. By controlling each compensating chamber separately, a wider range of mold density control is available.

Still another important feature in controlling mold density is the fact that two or more individual or separate compensating heads can be utilized in the same flask.

It is often necessary to use cross members or bars in the flask which, in essence, sub-divide the mold into separate sections. These bars are used as bonding surfaces to support the mold during the pouring and cooling process. The problem is to obtain a controlled dense mold even under the flask bars.

The mold hardness can be obtained by utilizing a separate compensating head to compact the sand in each section of sand between the flask bars. Again, all of the features which apply to a single chamber head will apply to a multiple compensating head machine plus an added feature of obtaining high mold density all around the flask bars. By controlling each compensating head separately, a wider range of mold density control is now available.

It is, accordingly, an object of the present invention to provide an improved molding machine using a thick flexible resilient pad as a compressing device in combination with a rigid pressure applying device.

Another object of the invention is to provide an improved molding machine utilizing a unique structure and method for applying pressure to the sand in the flask.

Still another object of the invention is to provide an improved molding machine.

Yet another object of this invention is to provide a molding machine having a flexible, relatively thick pad for applying pressure to the molding sand.

A further object of the invention is to provide an improved method of making a mold.

A still further object of the invention is to provide a molding machine which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is a front view partly in section of a molding machine according to the invention with the flask in position for rolling in and out of the machine from left to right;

FIG. 2 is a side view of the molding machine with an empty flask in position, the compensating head in retracted position, and the main cylinder lowered;

FIG. 7 is a diagram showing the cycle of ram travel and pressure cycle plotted against time;

Figure 9:
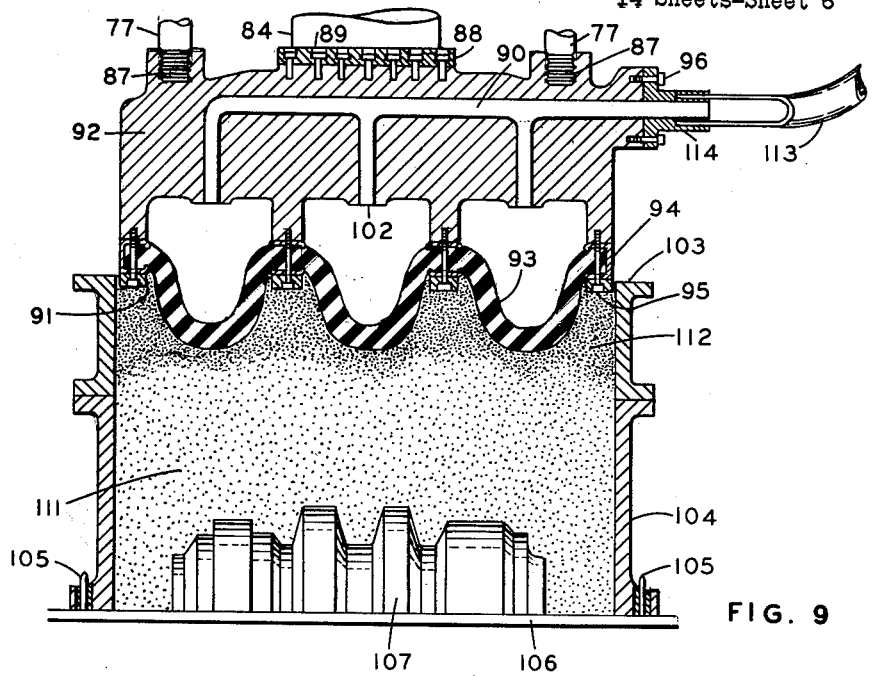
FIG. 9 is a view showing the initial position of the diaphragm or cushion inflated for pre-forming.
Figure 10A:
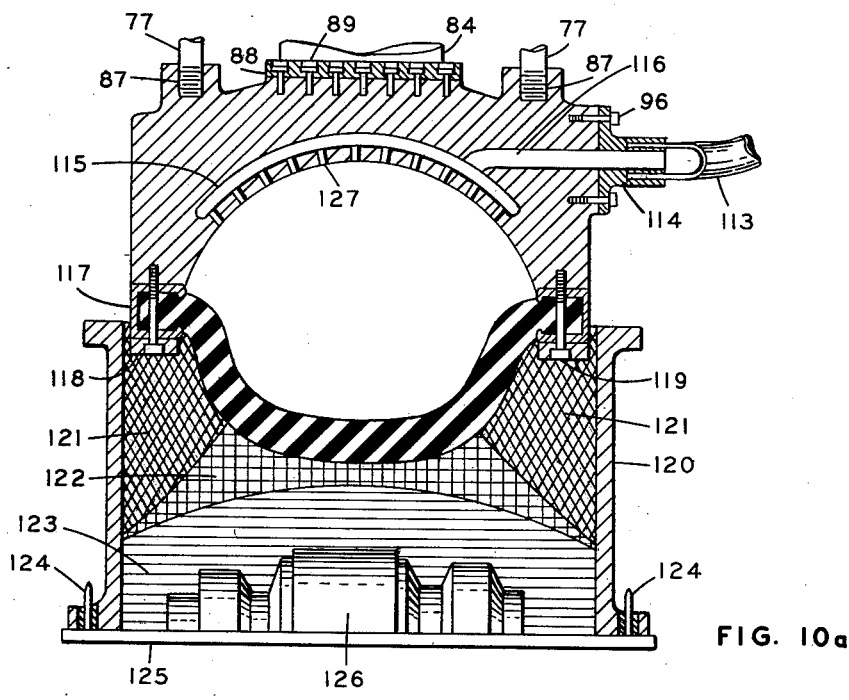
Figure 10B:
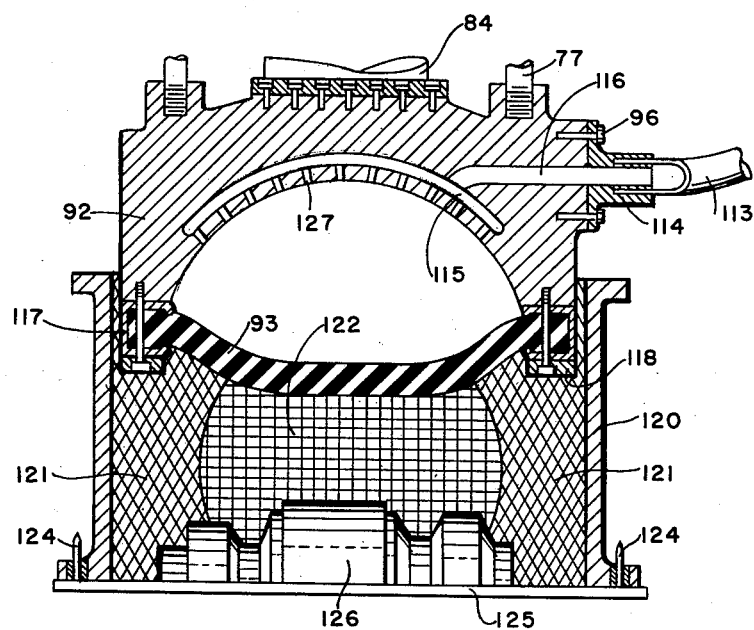
Figure 10C:
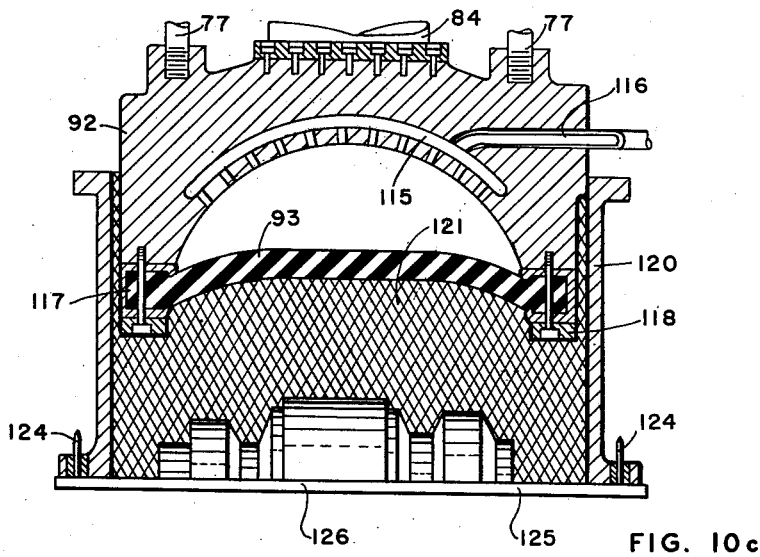
Figure 11:
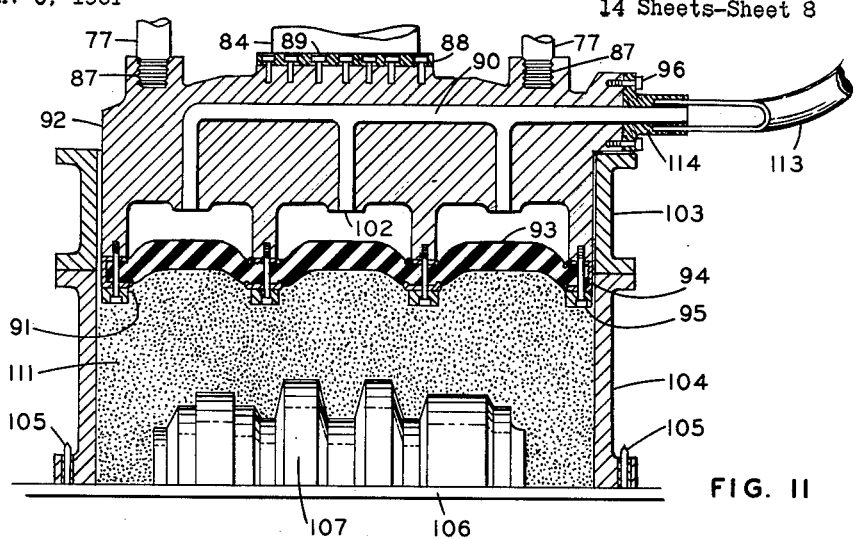
Figure 12:
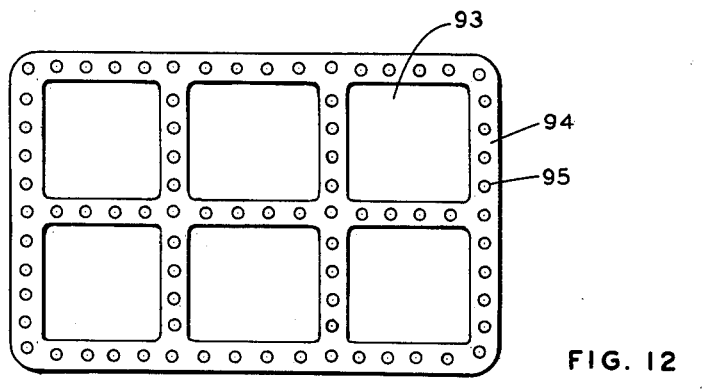
Figure 13:
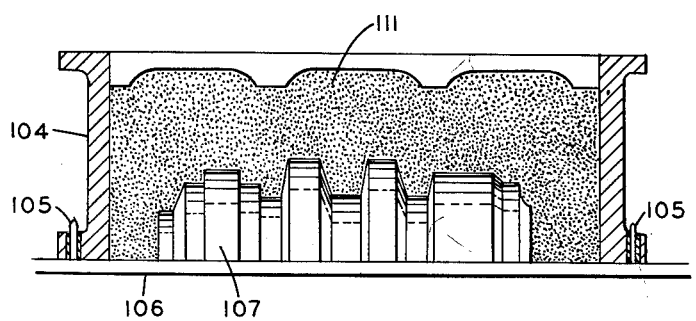
Figure 14:
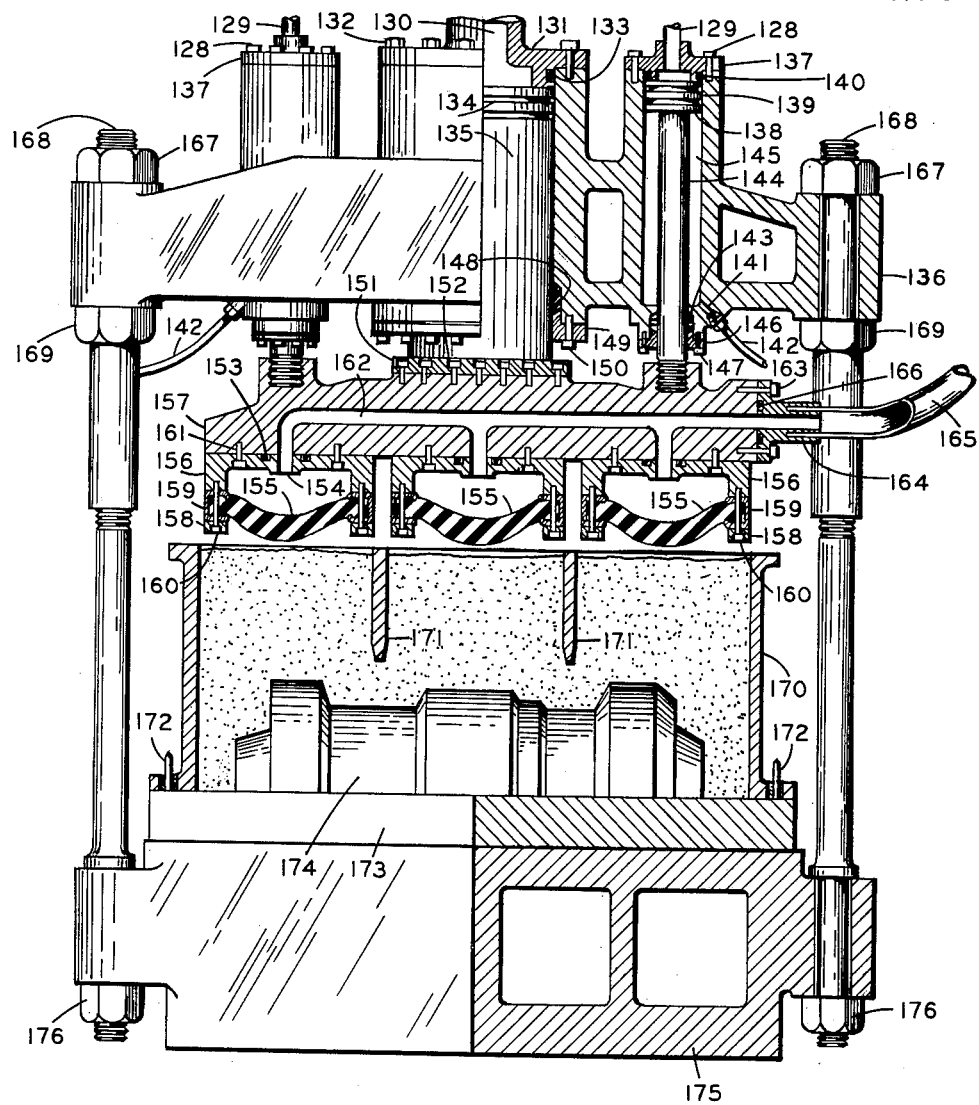
Figure 15:
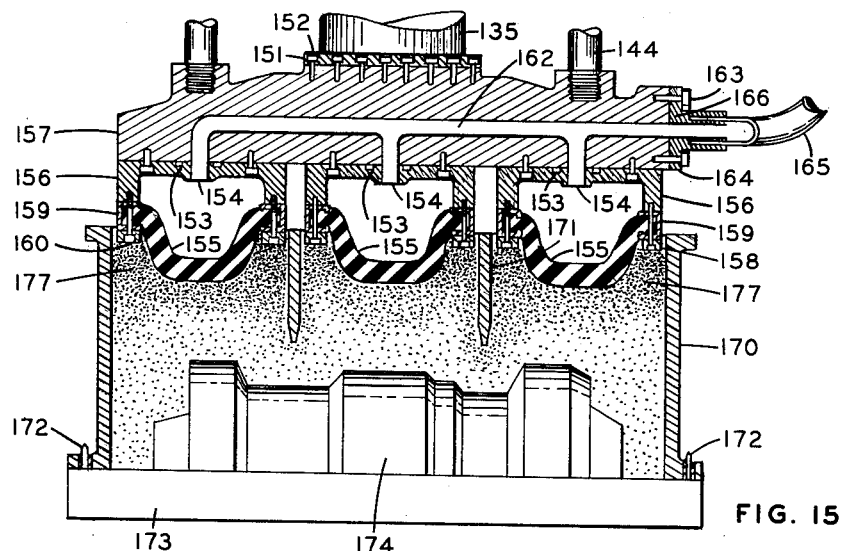
Figure 16:
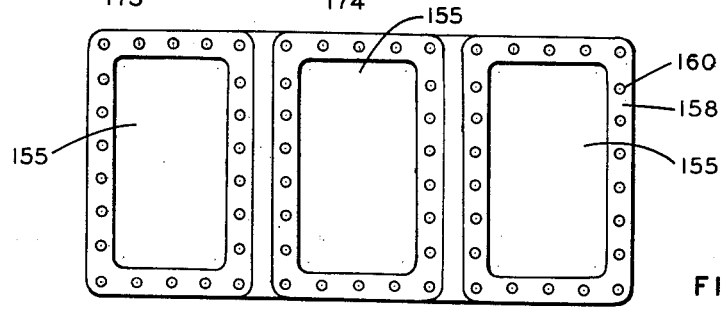
Figure 17:
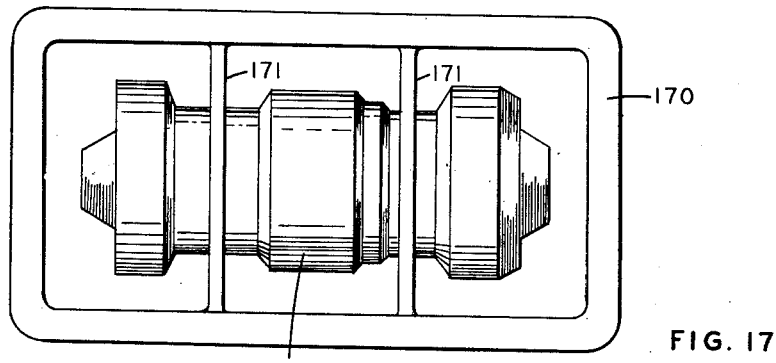
Figure 18:
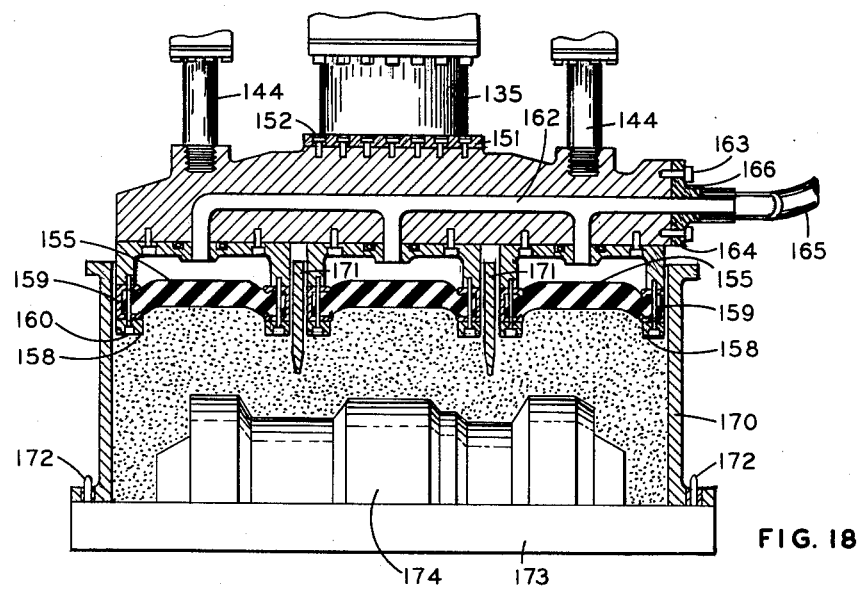
Figure 19:
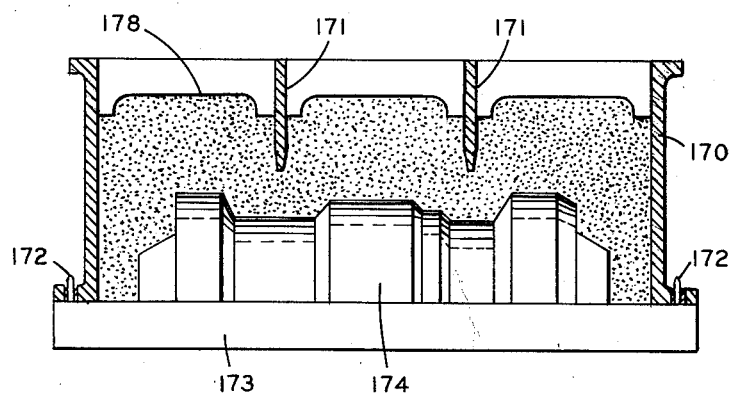
Figure 20:
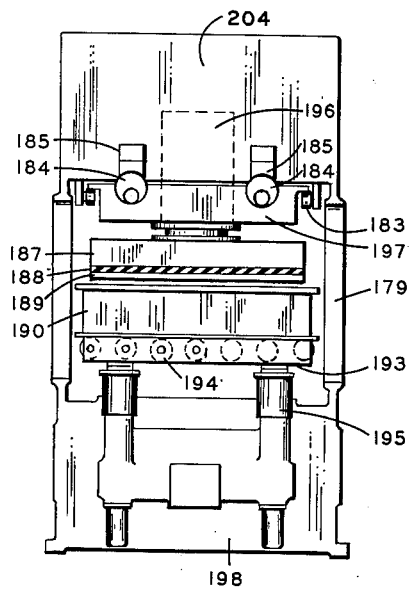
Figure 21:
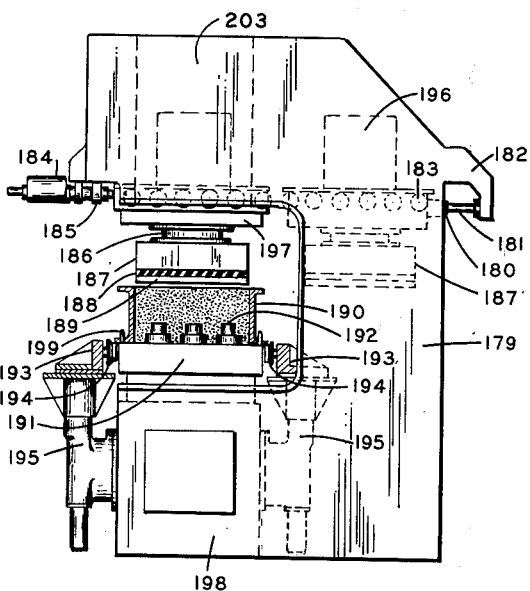
Figure 22:
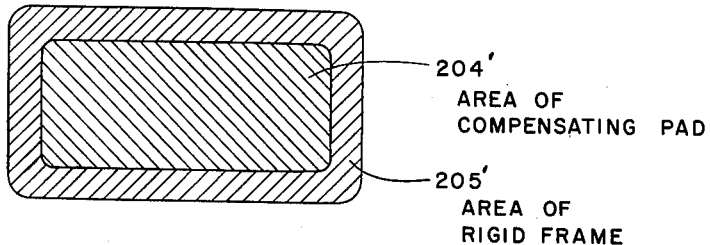
Figure 23:
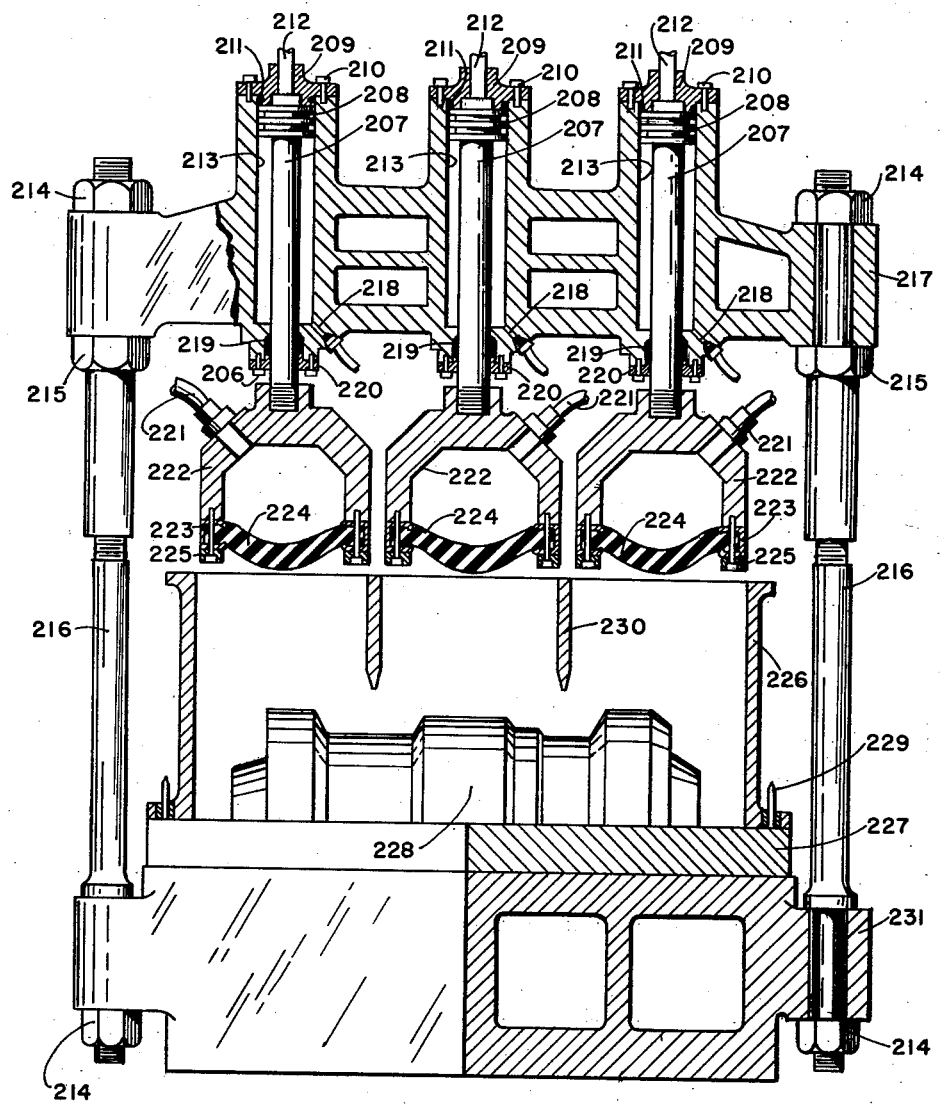

FIGS. 10a, 10b, and 10c show a single cavity pre-forming cushion as shown in FIG. 1 outlining the three areas of compaction and the relationship of the three areas during the molding cycle;

FIG. 11 is a view of the compensating head of the embodiment in FIG. 9 shown in final compression;

FIG. 12 is a bottom view of the retaining frame showing the pockets for multiple head squeezing;

FIG. 13 is a view showing the configuration on top of the mold after final compression;

FIG. 14 is a view of a molding machine with a three separate cushion head, the cushions on the head being spaced to squeeze between bars;

FIG. 15 is a view showing three compensating heads entering the flask and the diaphragms inflated to produce the initial squeeze;

FIG. 16 is a bottom view of the retaining frames of the three compensating heads;

FIG. 17 is a plan view of the flask seated on the pattern plate;

FIG. 18 is a view of the embodiment shown in FIG. 16 with the head in final molded position;

FIG. 19 is a longitudinal cross sectional view of a finished mold with the compensating head removed therefrom;

FIG. 20 is a front view of another embodiment of the invention;

FIG. 21 is a view partly in cross section of the machine shown in FIG. 20;

FIG. 22 shows schematically the projected areas of the compensating pad and rigid frame;

FIG. 23 is a view of the individual compensating heads; and

Figure 24:
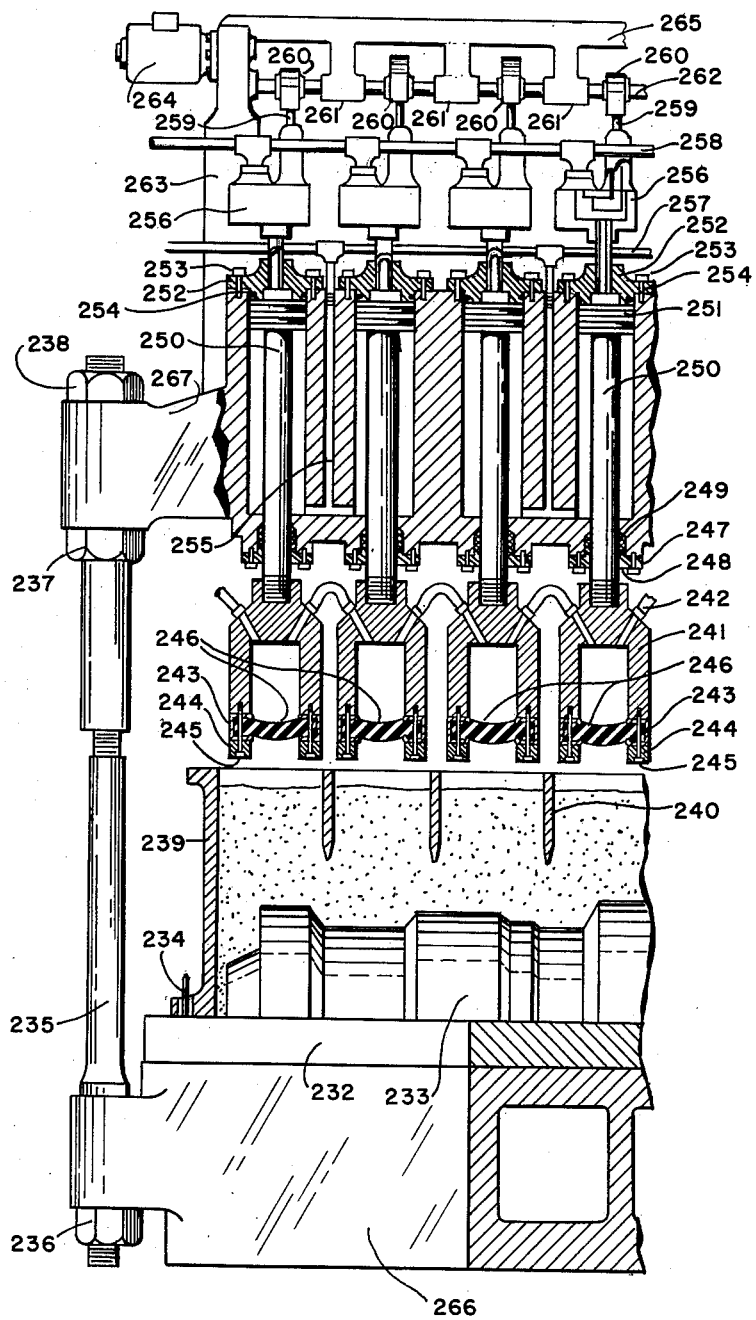

FIG. 24 is a view of the individual compensating heads with controls for each head.

Now with more particular reference to the drawings, a molding machine is shown in partial cross section in FIGS. 1 to 6 inclusive with the pattern plate, molding head, and upset in several positions throughout the several figures.

The molding machine has a base which is supported on a floor or the like and includes a C-frame 59, a compensating head 45 supported on the base, a flask 49 supported on rails 51, and a conveyor for the flask 49 under the loading means as shown. A transverse cylinder bracket 26 supports a transverse cylinder 27 which is attached to the compensating head or tank 45 to move the head from the position shown in FIG. 4 where it is over the flask and against a bonded rubber bumper 34. From this position, it may be moved to the position shown in FIG. 2 after molding.

The compensating head 45 is made in the form of a downwardly open tank which has a compensating pad 29 disposed across its open end and clamped thereto by means of a compensating pad retaining frame 30 which is bolted to the head and sandwiches the peripheral edges of the compensating pad 29 therebetween to form an air tight compartment within the head with the compensating pad forming a closure therefor.

The head 45 is carried on roller wheels 61 from the molding position over the flask to a position laterally thereof. The roller wheels 61 are fixed to a C-type side frame 69. When the head is moved into position over the flask, it engages hydraulic decelerating cushions 31 to stop it in position over the flask after the sand has been dispensed by a suitable dispensing means through an opening 43 in the machine head. The head is moved laterally in order to allow the sand to fill each empty flask that is moved into the position shown in FIG. 3 before the mold can be made.

A pattern plate 54 has suitable pattern characters 50 thereon and it is supported on a pattern table 53 which is carried on an inverted compression cylinder 56. In the position shown in FIG. 1, a flask 55 has been moved over wheels 52 supported on the rails 51 to a position over the pattern plate 54 and the pattern plate has been raised against the flask and has lifted the flask from the roller wheels 52. As shown in FIG. 1, the flask 49 can be rolled into position under the head on a roll out conveyor 32. When the pattern plate is lifted by the cylinder 56, it engages the flask and lifts it from the conveyor wheels. Pattern plate pins 65 engage the opening in the flask to index the flask to the exact position over the pattern plate.

An inverted piston 57 is bolted to the machine by hex head bolts 63 and it makes slidable engagement with the inside of the compression cylinder 56. The pattern table 53 is bolted to the upper end of the cylinder 56. When fluid pressure is admitted to the cylinder 56, it moves upwardly with the pattern table 53. The piston 57 has a piston shoulder 42 having a suitable groove therein which receives a piston packing 41 which is a seal for the piston 57.

An upset 46 is in the form of an open frame having outwardly extending flanges which are supported on an upset bracket 48. The compensating tank has flanges 60 on each side thereof which are supported on the compensating roller wheels 61. A compensating tank cylinder rod 68 is attached o the cylinder 27 and the piston in the cylinder moves the tank out while the flask is being filled and moves the flask in for molding.

The upset 46 is positively located by V-grooves 37 which rest on the upset brackets 48. The upset brackets are fixed to the C-frame 59. Hold down cylinders 44 are likewise fixed to the frame and they have piston rods 47 therein which engage the top of the upset and hold it down to prevent it from lifting off the flask when the flask is forced upwardly by the pattern plate lifted by the cylinder 56 during molding. The cylinder 56 moves upwardly and downwardly when urged by oil under pressure introduced through a passage 58 in the base which is connected to an index line 28. The index line 28 has a flange which is bolted at 65 to the bottom of the frame and has a seal 66 to seal the oil against leakage from passing from the line 28 into the passage 58. The oil from the passage 58 enters the space above a shoulder 67.

Figure 4:
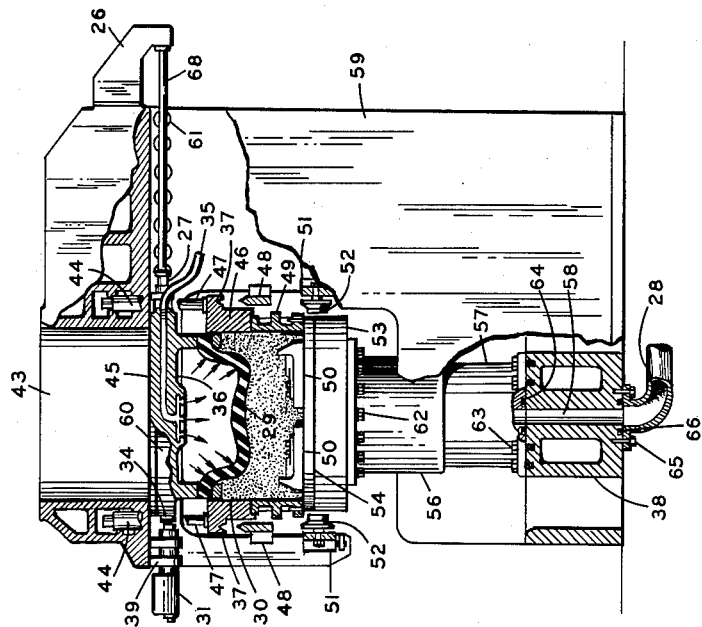
FIG. 4 is a longitudinal sectional view of the machine with the compensating head forward and air injected behind the compensating pad.
Figure 3:
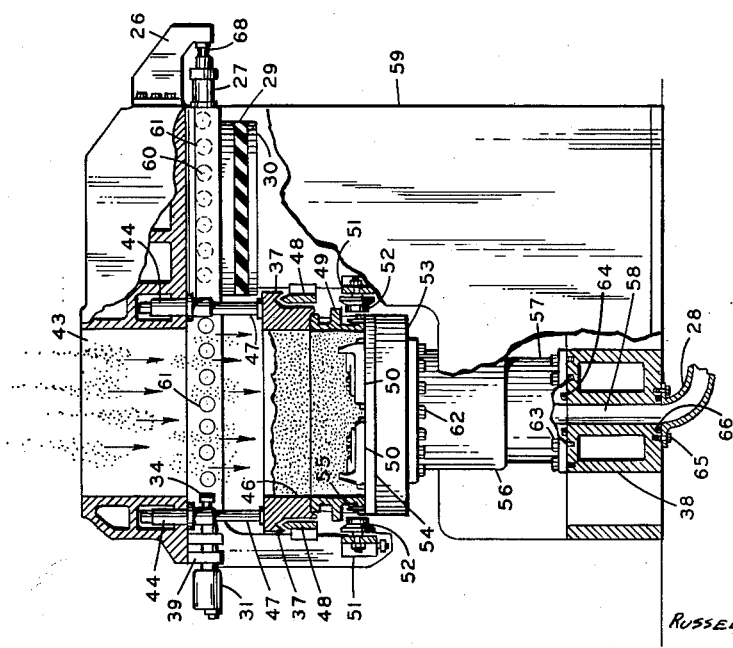
FIG. 3 is a longitudinal sectional view of the machine with the pattern plate, flask, and upset in engagement with each other and sand being dropped into the flask and upset, the compensating head being in retracted position.
Figure 6:
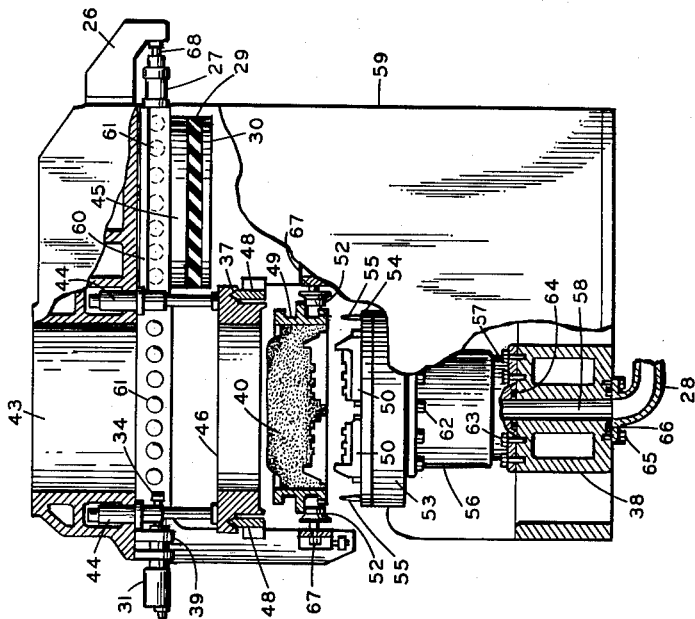
FIG. 6 is a similar view to FIG. 5 with the pattern plate stripped away from the completed mold and the compensating head retracted.

Initially, after the finished flask has been delivered to its proper repository after being lifted as shown in FIG. 6, a new flask will be moved in along roller wheels 33 on the conveyor 32 as shown in FIG. 1. The pattern plate 54 will then be elevated into engagement with the flask to lift it from the wheels 52 and to force it up against the upset. Then the sand will be dropped from a suitable dispensing means into the flask as shown in FIG. 3. The head will then be moved into position over the pattern plate. The flask and upset will be again lifted to bring the flask into engagement with the compensating tank.

Figure 5:
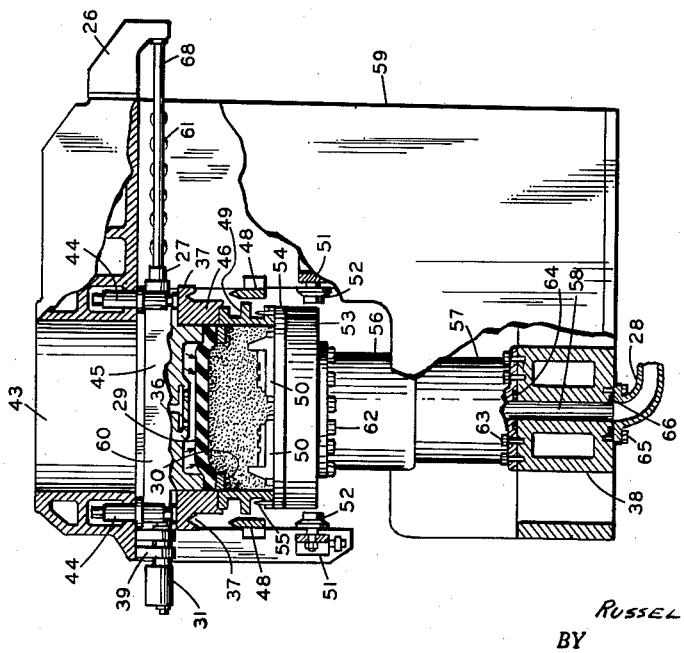
FIG. 5 is a longitudinal sectional view of the machine during its final compression stroke.

Air will be admitted through an intake line 35 to expand the pad or pads into a paraboloidal shape to cause the sand to flow from the center into the areas under the compensating pad retaining frame 30. Oil will then be forced through the passage 58 to drive the piston up further to cause the compensating pad retaining frame 30 to positively compress the sand around the outer periphery of the flask. This action will also cause the pad to compress the fluid in the tank which will further compress the sand under the compensating pad and the final top shape of the mold will be as shown in FIG. 5. The cylinder 56 will then be lowered to the position shown in FIG. 6. This will allow the pattern plate to assume its rest position shown, the flask with the completed mold therein will be ready to be moved down the conveyor, the upset will again rest on the upset brackets 48, and the compensating head may again be moved to the position shown in FIG. 6 so that another flask may be brought into position and filled to renew the cycle.

The pad must be at least one-fourth inch thick in order for it to retain its shape and to prevent contour molding. It should preferably be at least one-half inch thick.

A favorable timing curving for the process is shown in FIG. 7 wherein the dotted line indicates the ram travel or the travel of the cylinder 56. It will be noted that the air pressure behind the diaphragm builds up more rapidly at the beginning of the squeeze between the four and five second point on the cycle than the hydraulic squeeze pressure.

In the embodiment of the invention shown in FIGS. 8 to 13 inclusive, a molding machine is shown having a base 109 with columns attached thereto by a lower strain nut 108, an upper strain nut 99, and a strain nut 101. A pattern plate 106 is supported on the base 109 with a pattern character 107 thereon. Locating pins 105 are attached to the pattern plate. The pins 105 are received in suitable holes in the flask to locate it positively thereon. A flask 104 may be supported on the pattern plate 106 and an upset 103 is supported on the flask.

Figure 8:
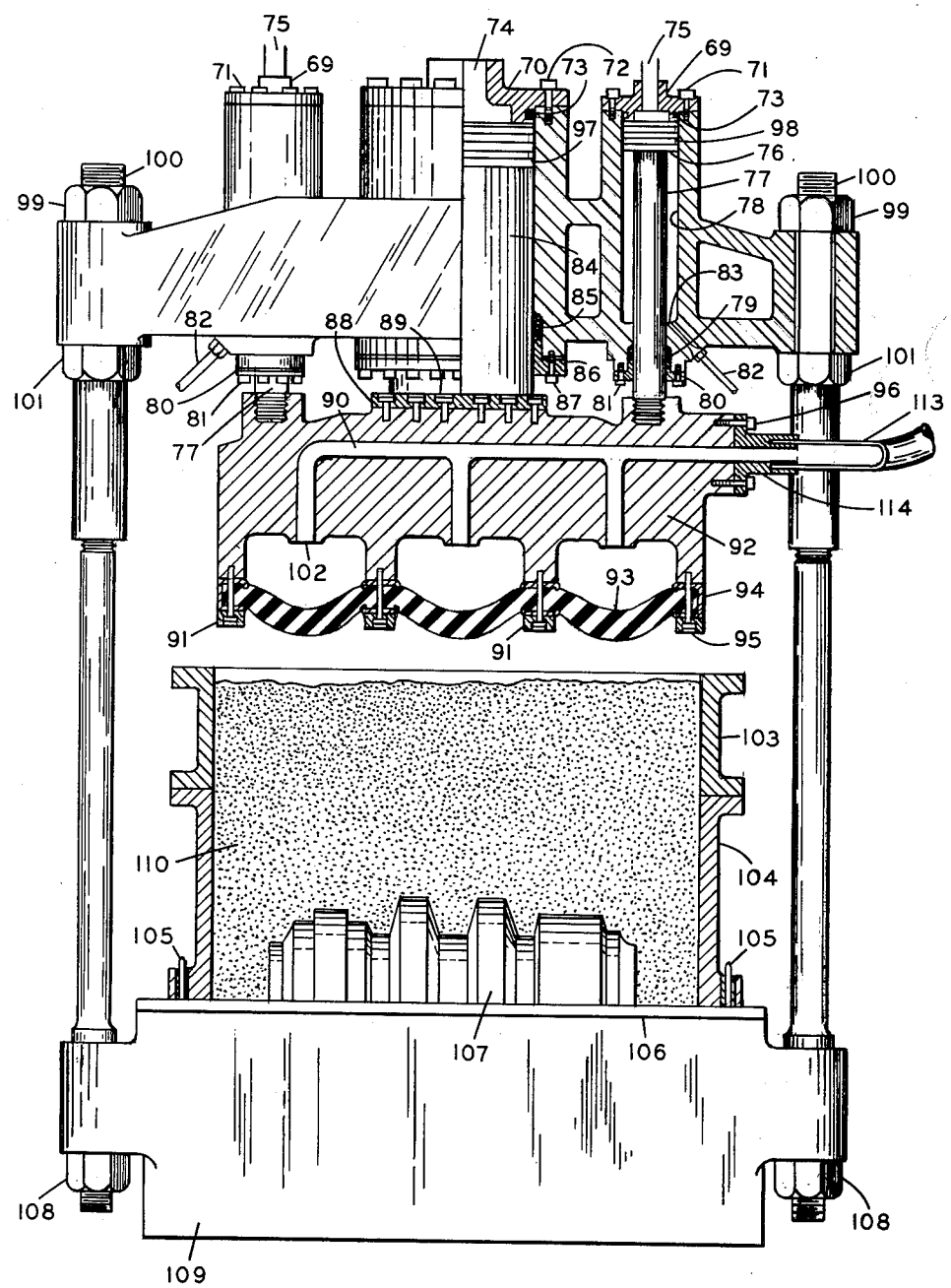
FIG. 8 is a cross sectional view of another embodiment of a molding machine showing the compensating head partitioned so that pre-forming can be accomplished in the center portions of the molds along with the outer perimeter.

A head 92 has outside dimensions which will allow it to slide freely in the upset as shown in FIG. 11 or it can be lifted up and withdrawn therefrom as shown in FIG. 8. The head 92 has the port for injecting air behind a cushion or pad 90 to move a cushion or pad 93 down into engagement with the sand. The cushion or pad 93 is attached to the head 92 by a cushion retaining frame 91 which is held in position by bolts 95. The cushion frame 91 acts as a positive sand compressing means much like a peen block while the pad 93 forms a yieldable compressing means. The edges of the diaphragm are received in a steel retainer 94 which is U-shaped in cross section and has the inwardly extending ends of the legs of the U which positively indent the edge of the diaphragm to hold is positively in position when clamped as shown. The flask is held positively in position by pins 124 on a pattern plate 125 with a pattern plate character 126 indicated thereon in FIGS. 9 and 10.

This embodiment shows a distribution cavity 115 with an air intake line 116 connected thereto and the diaphragm held by a retaining crimping pad or diaphragm support 117. The support 117 is engaged by a diaphragm retaining frame 118 held in position by bolts 119.

The compression head is supported on the frame by peripherally spaced cylinders 78, pistons 76, and rods 77. The pistons 76 are double acting in their cylinders. The fixed frame has the compression head retracting pistons 76 received in the compression head retracting cylinders 78 and the pistons are attached by the rods 77 to the head 92.

A fluid intake port 75 allows fluid to enter in the space above the pistons and fluid lines 82 allow fluid to be injected below the pistons to lift the head. A main compression cylinder 84 is centrally located to apply a final heavy compressive force to the sand. The main compression cylinder 84 has piston rings 97 which form a seal inside the cylinder and a packing gland 86 holds packing 85 into engagement with the cylinder to form a seal on the lower side of the piston. The packing gland 86 is held in place by hex bolts 87 which clamp the packing gland in position. The piston has a flange 88 thereon which is bolted to the compensating head castings by socket head bolts 89. The piston rods 77 have rod packings 79 disposed in an enlarged groove in the end of the cylinder and the packing gland 80 is held in place to hold the packing around the piston rod by means of hex head bolts 81.

The main cylinder has an end cap 70 held in place by bolts 72 with an O-ring 73 disposed in a suitable groove to prevent leakage. An intake port 74 is provided to provide fluid above the piston. The cylinders 78 have an end cap 69 held in place by bolts 71. An air intake line 133 for the compensating head is connected to the head by means of hex head bolts 96 which are inserted in a flange connection 114. Air may be admitted through intake ports 102 to the space above the compensating pad 93 to compress sand thereunder.

Sand in its natural state indicated in FIG. 9 is first put into the flask 104 and the upset 103. The head is then lowered by the pistons indicated and sand 111 is first compressed by the pad 93 to pack it above the pattern and to cause sand to flow outward to the periphery around the inside of the mold to pre-form as indicated at 112 and form a packed column of sand under the frame 91. Air pressure may then be increased to drive sand outward to a space 121 where the major pre-formed area occurs in a flask 120. A second pre-formed area 122 is disposed directly below the diaphragm and this area depends upon the diaphragm itself for its packing.

A limited pre-formed area 123 directly above the pattern will be of uniform hardness over the entire surface of the pattern while the part at 121 will be of considerably greater density and hardness as it is compressed positively below a frame 118. Thus, the mold will be of optimum hardness adjacent the pattern and, also, of optimum hardness around the edges. This is due in part to the flow of sand from the center to the edges during the molding process.

The embodiment of the invention shown in FIGS. 14 to 19 discloses a cross head assembly 136 supported on a base 175 by strain rods 168. The rods 168 are clamped at the top by means of bolts 167 and 169 and at the bottoms by nuts 176. The base 175 supports a pattern plate 173 which rests thereon and has a suitable pattern 174 and upwardly extending pins 172 which enter suitable openings in a flask 170 to hold it in position. Laterally extending flask bars 171 are attached to opposite sides of the flask 170 and these bars form reinforcing members to hold the sand in position.

Diaphragms or compensating pads 155 are supported across the rectangular openings in a diaphragm retaining frame 158 and form closures for the spaces therein. The frame 158 is held on by socket head bolts 160. The frame 158 sandwiches the edges of the diaphragm between the steel retainer, crimping the pad indicated at 159 which extends around the openings in the heads.

A suitable lower compensating pad frame 156 is bolted to the upper structure for mounting multiple compensating heads 157 so that as many compensating heads as desired can be bolted thereto by bolts 161. O-rings 153 are disposed in suitable grooves around intake ports 154 to seal against leakage of air between the lower compensating pad frame 156 and the head 157. Air passes through a flexible intake 165 and flange connections 164 to a channel 162. The flange connection 164 is bolted to the head by means of bolts 163. The air entering the flange connection 164 is sealed by O-rings 166 in suitable grooves.

A main compression piston 135 is supported in the compensating head cylinder and it has piston rings 134 thereon which form a positive seal therewith. The lower end of the piston 135 is sealed by a packing 148 which is held in position by a retaining packing gland 149 held in place by hex head bolts 150. The piston has a flange 151 attached by bolts 152 to the head 157.

Compensating head retracting pistons 138 have rings 139 thereon. An O-ring 140 is received in a suitable groove in end caps 137 and the end caps 137 are supported in place by bolts 128 so that fluid entering an intake port 129 will force the piston down so that fluid will not leak out around the flange.

Fluid for the main piston 135 is supplied to intake ports 130 in an end cap 131 which is held in place by bolts 132 and has O-rings 133 supported in a suitable groove to prevent leakage. Air is injected under the pistons 138 through intake ports 141 which are supplied by a line 142. Leakage around the piston rods is prevented by a packing 143 which is held in place around the compression head retracting piston rods 144 by a packing gland 146 which holds the packing 143 in position. Hex head bolts 147 hold the packing gland 146 in position to prevent leakage from a compression head retracting cylinder 145. Therefore, the head can be lifted and forced down for the pre-forming stroke by the pistons 138 and forced downwardly for the final compression by the large main compression cylinder 135.

It will be seen from FIG. 15 that when the pad 155 is first expanded, it will take the form of a paraboloid. This will drive the sand to the dense areas 177 to pre-form it in these areas and to slightly compress it above the pattern. Then as the head is further lowered, the diaphragm itself will continue to compress the sand to some degree at the center over the pattern. The sand adjacent the bars 171 will be positively compressed. This will give the desired mold hardness around the edge to make a solid mold and yet give optimum mold hardness adjacent the pattern, using a minimum amount of sand.

In the embodiment of the invention shown in FIGS. 20 and 21, a flask 190 is supported on a pattern plate 191 which is carried by the frame of the machine. The flask 190 is carried by rollers 194 supported on roller rails 193. Pattern characters 192 are also supported on the pattern plate 191.

A machine frame 179 is C-shaped and has a top 203 having a front part indicated at 204. The top 203 carries the roller conveyor members 183. These conveyor members carry a head 187 to move it into the position shown in full lines for molding and to move it into the dotted line position shown in FIG. 21 for loading the flask.

The head 187 is forced upwardly and downwardly by a hydraulic cylinder 196 having a piston 186 therein guided by a sealing member 197. The movement of the head is stopped by a dashpot 184 supported on the machine frame by brackets 185. The head has a downwardly opening cavity therein which is closed by a pad 188 held in place by a rigid frame 189. The flask is located by means of pins 199 which are fixed to the pattern plate and are received in openings in the lower flange of the flask.

The flask and pattern plate are moved upwardly by cylinders 195 which are fixed to the frame and have a piston connected to the pattern plate. These cylinders are fixed to the machine base 198.

The movement of the head away from the flask is checked by a dashpot 181 having a resilient head engaging member 180 thereon and supported on a bracket 182 on the frame 179.

FIG. 22 shows a projected view of the pad indicated at 204' which corresponds to the pad 188 and a flask 205' which corresponds to the frame 189 in FIG. 20.

In the embodiment of the invention shown in FIG. 23, a molding machine is shown with a base 231 with an upper frame 217 held in place by strain rods 216, strain rod nuts 214, and nut assemblies 215. A pattern plate 227 is supported on the base 231 with a pattern character 228 thereon. Locating pins 229 are attached to the pattern plate 227 and are received in suitable holes in the flask to locate it positively thereon.

Heads 222 are of a dimension that they will slide freely in a flask 226 between flask bars 230 when the heads are moved relative to the flask. The heads 222 have ports 221 for injecting air or fluid behind a cushion pad 224 to move it into contact with the sand. The cushion pad 224 is attached to the head by a compensating pad retaining frame 225. The frame 225 acts as a positive sand compressing means. The edges of the pad are received in a steel retainer 223 which is U-shaped in cross section and has inwardly extending ends of the legs of the U which positively indent the edge of the pad to hold it.

The upper frame 217 is composed of a series of individual cylinders 213, pistons 208, and rods 207. The rods 207 are double acting. The piston rods 207 are attached to the compensating head 222. Fluid intake ports 212 allow fluid to enter in the space above the pistons and fluid lines 218 allow fluid to be injected below the pistons to lift the heads. The cylinders 213 have end caps 209 and 220 held in place by bolts 210 at the top and 206 at the bottom. Seals 219 and O-rings 211 are provided for fluid tight seals for the cylinder operation.

Because the flask has bars, the individual heads 222 can be controlled separately by controlling the time that the fluid enters through the port 212 or the fluid line 218.

Another available control is the timing and control of the fluid pressure entering and leaving through the port 221 into the cavity above the pad 224.

All of the features which apply to the single head machine are similar to those shown in FIGS. 1 to 6.

In the embodiment of the invention shown in FIG. 24, a molding machine is shown with a base 266 and with an upper frame 267 held in place by strain rods 235, strain rod nuts 236 and 238, and strain rod nut assemblies 237. A pattern plate 232 is supported in the base 266 with a pattern character 233 thereon. Locating pins 234 are attached to the pattern plate and are received in suitable holes in a flask 239 to locate it positively thereon.

Heads 241 are of such dimension that they will slide freely in the flask 239 between flask bars 240 when the heads are moved relative to the flask. The heads 241 have ports 242 for injecting air or fluid behind a cushion pad 246 to move the cushion pad into contact with the sand. The cushion pad 246 is attached to the head by a compensating pad retaining frame 244. The frame 244 acts as a positive sand compressing means. The edges of the pad are received in a steel retainer 243 which is U-shaped in cross section and has bolts 245 clamping it in position.

The heads will control the density of the sand in the areas adjacent the bars 240 as well as over the pattern.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A molding machine comprising a head, means to support a flask below said head, said head having a flat, downwardly facing, outer peripheral surface thereon, spaced, downwardly facing surfaces on said head inwardly disposed of said outer peripheral surface, said downwardly facing surfaces being disposed in substantially the same plane as said outer peripheral surface, a heavy flexible pad attached to said peripheral surface and to said inwardly disposed surfaces, a retainer frame generally coextensive with all said surfaces resting on said pad and attached to said head holding said pad to said head, said pad defining a plurality of chambers in said head, means to inject air under pressure into said head behind said pad, said head being slightly smaller in outside dimension than said flask, and means on said machine to force said head into said flask whereby said frame rigidly compacts sand therein adjacent the peripheral edges thereof, said frame overlying said inwardly disposed surfaces compacting sand inwardly from the edges of said flask with a positive force, said pad packing said sand between said frame edges, the parts of said head supporting said inwardly disposed surfaces having downwardly facing slots therein, said flask having transversely extending bars attached to its side edges and extending across it, said bars being received in said slots when said head is forced into said flask to compact sand therein.

2. A molding machine comprising a head, means to support a flask below said head, said head having a flat, downwardly facing, outer peripheral surface thereon, spaced, downwardly facing surfaces on said head inwardly disposed of said outer peripheral surface, said downwardly facing surfaces being disposed in substantially the same plane as said outer peripheral surface, a heavy flexible pad attached to said peripheral surface and to said inwardly disposed surfaces, a retainer frame generally coextensive with all said surfaces resting on said pad and attached to said head holding said pad to said head, said pad defining a plurality of chambers in said head, means to inject air under pressure into said head behind said pad, said head being slightly smaller in outside dimension than said flask, and means on said machine to force said head into said flask whereby said frame rigidly compacts sand therein adjacent the peripheral edges thereof, said frame overlying said inwardly disposed surfaces compacting sand inwardly from the edges of said flask with a positive force, said pad packing said sand between said frame edges, the parts of said head supporting said inwardly disposed surfaces having downwardly facing slots therein, said flask having transversely extending bars attached to its side edges and extending across it, said bars being received in said slots when said head is forced into said flask to compact sand therein, said inwardly disposed surfaces having small areas relative to the area of said pad, said small areas having said pad completely around them.

References Cited in the file of this patent

UNITED STATES PATENTS

| | | |
|---|---|---|
| 408,386 | Moore | Aug. 6, 1889 |
| 2,962,775 | Rekart | Dec. 6, 1960 |
| 2,962,776 | Taccone | Dec. 6, 1960 |
| 2,968,846 | Miller | Jan. 24, 1961 |

FOREIGN PATENTS

| | | |
|---|---|---|
| 14,724 | Great Britain | Mar. 14, 1907 |
| 576,787 | Canada | June 2, 1959 |